United States Patent
Chen

(10) Patent No.: US 7,437,489 B2
(45) Date of Patent: Oct. 14, 2008

(54) DATA PACKET QUEUE HANDLING METHOD AND SYSTEM

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 550 days.

(21) Appl. No.: 11/054,984

(22) Filed: Feb. 9, 2005

(65) Prior Publication Data

US 2006/0149864 A1 Jul. 6, 2006

(30) Foreign Application Priority Data

Dec. 31, 2004  (TW) .............................. 093141703

(51) Int. Cl.
*G06F 13/00* (2006.01)
(52) U.S. Cl. .............................. 710/33; 710/15; 710/17; 710/44; 710/56
(58) Field of Classification Search .................... 710/15, 710/17, 33, 44, 56, 57
See application file for complete search history.

(56) References Cited

U.S. PATENT DOCUMENTS

| 6,754,732 B1 * | 6/2004 | Dixon et al. ................... 710/22 |
| 6,851,008 B2 * | 2/2005 | Hao ........................... 710/305 |
| 7,145,869 B1 * | 12/2006 | Kadambi et al. ............ 370/229 |

* cited by examiner

*Primary Examiner*—Niketa I. Patel
*Assistant Examiner*—Jasjit Vidwan
(74) *Attorney, Agent, or Firm*—Jianq Chyun IP Office

(57) ABSTRACT

A data packet queue handling method and system is proposed, which is designed for use with a computer system having a data packet generating unit, a data packet transfer interface, a data packet processing unit, and a memory unit, wherein the data packet generating unit is capable of generating a sequence of data packets which are transferred via the data packet transfer interface to the data packet processing unit. The proposed method and system is capable of providing a novel data packet queue handling capability that can help prevent the occurrence of a deadlock condition in the computer system due to a memory-sufficient condition in the memory unit, so that the overall throughput of the computer system can be ensured.

6 Claims, 1 Drawing Sheet

DATA PACKET QUEUE HANDLING METHOD AND SYSTEM

BACKGROUND OF THE INVENTION

1. Field of the Invention

This invention relates to information technology (IT), and more particularly, to a data packet queue handling method and system which is designed for use in conjunction with a computer system for providing a novel data packet queue handling capability that can help prevent deadlock in the computer system during the processing of a sequence of data packets in the computer system so that the overall system throughput of the computer system can be ensured.

2. Description of Related Art

In the operation of a computer system with a peripheral device, an I/O control chip is required for use to transfer a sequence of data packets generated by the peripheral device to a software-based driver module for processing by the driver module. These data packets are for example read/write access commands, and each requires the allocation of a specific amount of storage space in the main memory unit of the computer system for the execution of the requested data read/write procedure.

Presently, one conventional data packet queue handling method is implemented in such a manner that when the I/O control chip wants to transfer a sequence of data packets to the driver module, a buffer area is allocated in the main memory unit so that all of the data packets are arranged into this buffer area for being processed by the driver module in a preset sequential order, such as FIFO (First In First Out) order.

One drawback to the foregoing data packet queue handling method, however, is that in the event that the storage space of the main memory unit is nearly fully occupied by data packets or program code such that the remaining storage space is insufficient to accommodate a further data packet that requests a memory amount greater than the remaining storage space of the memory unit, then a deadlock condition will occur that could cause the entire computer system operation to be halted.

SUMMARY OF THE INVENTION

It is therefore an objective of this invention to provide a data packet queue handling method and system for use with a computer system for the purpose of providing the computer system with a novel data packet queue handling capability that can help prevent deadlock in the computer system during the processing of a sequence of data packets so that the overall system throughput of the computer system can be ensured.

The data packet queue handling method and system according to the invention is designed for use in conjunction with a computer system for providing a novel data packet queue handling capability that can help prevent deadlock in the computer system during the processing of a sequence of data packets in the computer system so that the overall system throughput of the computer system can be ensured.

The data packet queue handling method and system according to the invention is characterized by that in the event of a memory-sufficient condition in the main memory unit, the invention will respond to this event by issuing a data packet halting message to activate the data packet transfer interface to temporarily halt the data packet transfer operation, and then continually inspecting whether the memory unit has released sufficient free storage space for the processing of the first-priority data packet queued in the data packet transfer interface; if YES, the first-priority data packet will be transferred to a buffer area in the memory unit for being processed by the data packet processing unit. This feature can help prevent the occurrence of a deadlock condition in the computer system due to a memory-sufficient condition in the main memory unit, so that the overall system throughput of the computer system can be ensured.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
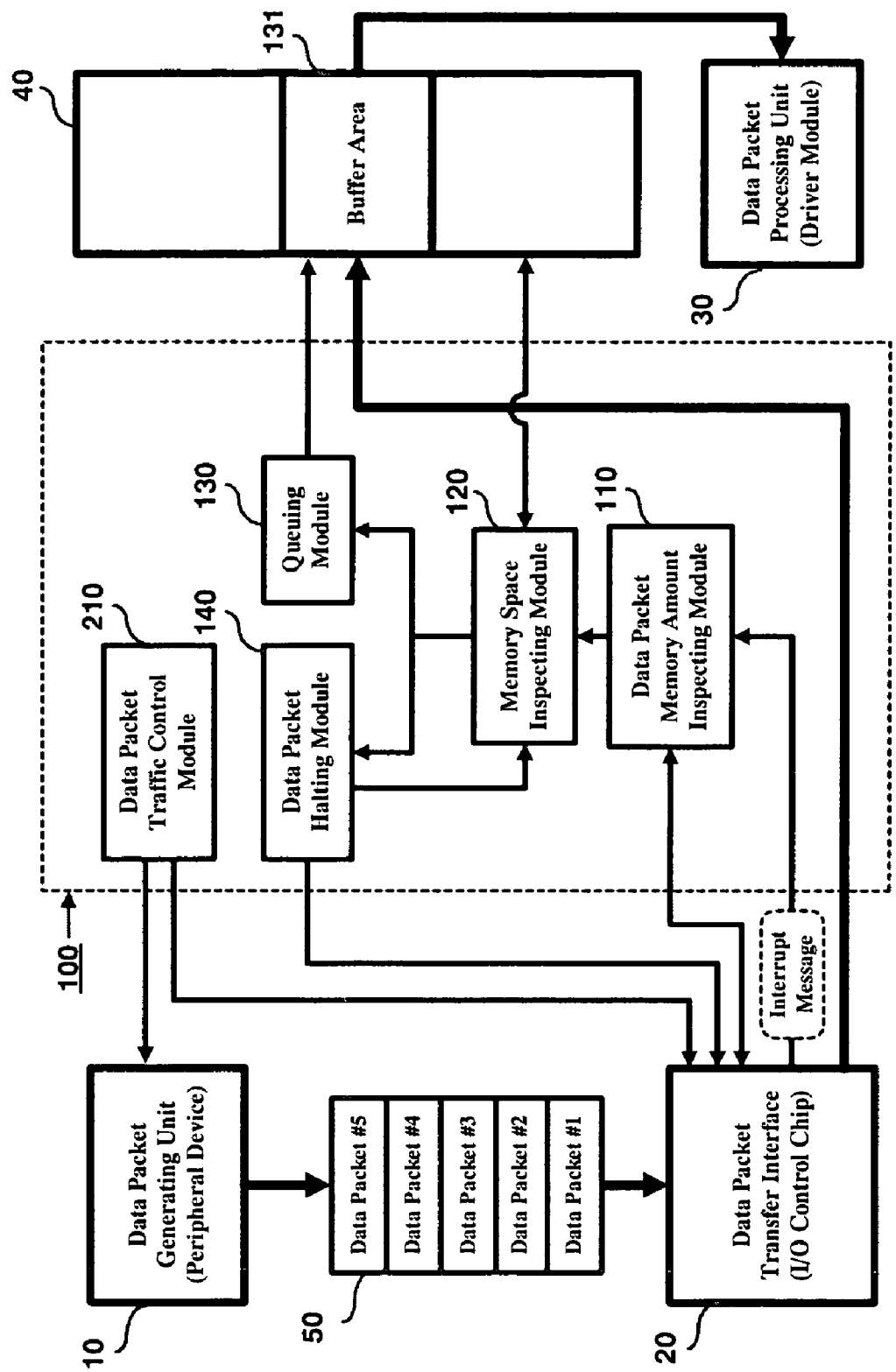
FIG. 1 is a schematic diagram showing the application architecture and modularized object-oriented component model of the data packet queue handling system according to the invention.

The data packet queue handling method and system according to the invention is disclosed in full details by way of preferred embodiments in the following with reference to the accompanying drawings.

FIG. 1 is a schematic diagram showing the application architecture and modularized object-oriented component model of the data packet queue handling system according to the invention (as the part enclosed in the dotted box indicated by the reference numeral 100). As shown, the data packet queue handling system of the invention 100 is designed for use with a computer system having a data packet generating unit 10, a data packet transfer interface 20, a data packet processing unit 30, and a memory unit 40, wherein the data packet generating unit 10 is capable of generating a sequence of data packets 50 which are transferred via the data packet transfer interface 20 to the data packet processing unit 30. Functionally, the data packet queue handling system of the invention 100 is capable of providing a data packet queue handling function for the sequence of data packets 50 queued in the data packet transfer interface 20 for these data packets 50 to be processed one by one by the data packet processing unit 30.

In one practical application, for example, the data packet generating unit 10 is an access control unit in a peripheral device such as a hard disk module; the data packet transfer interface 20 is an I/O (Input/Output) control chip; and the data packet processing unit 30 is a software-based driver module. Moreover, the data packets 50 generated by the data packet generating unit 10 are each an access command which requires the allocation of a specific amount of storage space in the memory unit 40 for the execution of the requested data read/write procedure.

As shown in FIG. 1, the modularized object-oriented component model of the data packet queue handling system of the invention 100 comprises: (a) a data packet memory amount inspecting module 110; (b) a memory space inspecting module 120; (c) a queuing module 130; and (d) a data packet halting module 140; and can further optionally comprise a data packet traffic control module 210. In practical implementation, for example, the data packet queue handling system of the invention 100 can be fully realized by a computer program which is integrated as an add-on software/firmware module to the computer system.

The data packet memory amount inspecting module 110 is capable of being activated by an interrupt message generated by the data packet transfer interface 20 in the event that the data packet transfer interface 20 receives one or more data packets from the data packet generating unit 10 and thereupon capable of inspecting the memory amount requested by the first-priority data packet queued in the data packet transfer interface 20 and accordingly issuing a corresponding memory space inspection enabling message to the memory space inspecting module 120.

The memory space inspecting module 120 is capable of responding to the memory space inspection enabling message from the above-mentioned data packet memory amount inspecting module 110 by inspecting whether the currently-available free storage space of the memory unit 40 is sufficient to satisfy the requested memory amount by the first-priority data packet queued in the data packet transfer interface 20. If YES, the memory space inspecting module 120 issues a memory-sufficient message to the queuing module 130; and whereas if NO, the memory space inspecting module 120 issues a memory-insufficient message to the data packet halting module 140.

The queuing module 130 is capable of responding to the memory-sufficient message from the above-mentioned memory space inspecting module 120 by first assigning a buffer area 131 in the memory unit 40 whose storage space is equal to the requested memory amount by the first-priority data packet queued in the data packet transfer interface 20, and then arranging the first-priority data packet queued in the data packet transfer interface 20 into the buffer area 131 for being processed by the data packet processing unit 30. Subsequently, after the first-priority data packet has been arranged in the buffer area 131, the queuing module 130 is further capable of activating the memory space inspecting module 120 to handle the next-priority data packet queued in the data packet transfer interface 20 (if any), and repeat the data packet amount inspecting procedure, the memory space inspecting procedure, and the queuing procedure again to transfer the next-priority data packet into the buffer area 131 for being processed by the data packet processing unit 30, until all of the remaining data packets 50 queued in the data packet transfer interface 20 have been arranged in the buffer area 131.

The data packet halting module 140 is capable of responding to the memory-insufficient message from the memory space inspecting module 120 by first issuing a data packet halting message to command the data packet transfer interface 20 to temporarily halt the data packet transfer operation, and then continually issuing a memory space inspection enabling message to the memory space inspecting module 120 at predefined time intervals to thereby command the memory space inspecting module 120 to continually inspect whether the memory unit 40 has released a sufficient amount of storage space that is enough for processing the first-priority data packet queued in the data packet transfer interface 20. In practical implementation, for example, the data packet halting module 140 can utilize a flag to indicate whether the data packet transfer interface 20 still has any remaining data packets 50 queued therein; i.e., when the flag is set to the logical value [1], it indicates that the data packet transfer interface 20 still has one or more remaining data packets 50 that are not yet transferred to the data packet processing unit 30; and whereas when flag is set to the logical value [0], it indicates that the data packet transfer interface 20 is empty of data packets.

The data packet traffic control module 210 is capable of responding to an event of the data packet transfer interface 20 being fully loaded with data packets and unable to accommodate any further data packets from the data packet generating unit 10 by commanding the data packet generating unit 10 to stop outputting data packets to the data packet transfer interface 20.

Referring to FIG. 1, in actual operation, whenever the data packet transfer interface 20 receives one or more data packets 50 from the data packet generating unit 10, the data packet transfer interface 20 will queue these data packets 50 and issue an interrupt message. In response to this interrupt message, the data packet memory amount inspecting module 110 inspects the memory amount requested by the first-priority data packet 50 queued in the data packet transfer interface 20 and accordingly issues a corresponding memory space inspection enabling message to the memory space inspecting module 120, thereby activating the memory space inspecting module 120 to respond by inspecting whether the memory unit 40 currently has sufficient free storage space to satisfy the requested memory amount by the first-priority data packet queued in the data packet transfer interface 20. If YES, the memory space inspecting module 120 issues a memory-sufficient message to the queuing module 130; and whereas if NO, the memory space inspecting module 120 issues a memory-insufficient message to the data packet halting module 140

In the event of a memory-sufficient message from the memory space inspecting module 120, it causes the queuing module 130 to respond by first assigning a buffer area 131 in the memory unit 40 whose storage space is equal to the requested memory amount by the first-priority data packet queued in the data packet transfer interface 20, and then arranging the first-priority data packet queued into the buffer area 131 for being processed by the data packet processing unit 30. After the first-priority data packet is arranged in the buffer area 131, the queuing module 130 subsequently activates the memory space inspecting module 120 to handle the next-priority data packet queued in the data packet transfer interface 20 (if any), and repeat the data packet amount inspecting procedure, the memory space inspecting procedure, and the queuing procedure once again to transfer the next-priority data packet into the buffer area 131 for being processed by the data packet processing unit 30. This process is repeated again and again until all of the remaining data packets 50 queued in the data packet transfer interface 20 have been arranged into the buffer area 131 for being processed by the data packet processing unit 30.

On the other hand, in the event of a memory-insufficient message from the memory space inspecting module 120, it causes the data packet halting module 140 to respond by first issuing a data packet halting message to the data packet transfer interface 20 to thereby command the data packet transfer interface 20 to temporarily halt the data packet transfer operation, and then continually issuing a memory space inspection enabling message to the memory space inspecting module 120 at predefined time intervals for the purpose of commanding the memory space inspecting module 120 to repetitively inspect whether the memory unit 40 has released a sufficient amount of free storage space. When a sufficient amount of free storage space is available, the memory space inspecting module 120 issues a memory-sufficient message, which causes the data packet halting module 140 to disable its halting operation and meanwhile causes the queuing module 130 to arrange the first-priority data packet queued in the memory space inspecting module 120 into the buffer area 131 in the memory unit 40 for being processed by the data packet processing unit 30.

During the foregoing data packet queue handling procedure, if the data packet transfer interface 20 is fully loaded with data packets 50 and unable to accommodate further data packets from the data packet generating unit 10, it will cause the data packet traffic control module 210 to respond by commanding the data packet generating unit 10 to temporarily stop outputting data packets to the data packet transfer interface 20 until the amount of data packets 50 queued in the data packet transfer interface 20 has been reduced to release a sufficient amount of buffer space.

In conclusion, the invention provides a data packet queue handling method and system for use with a computer system for providing the computer system with a novel data packet queue handling capability, which is characterized by that in the event of a memory-sufficient condition in the memory unit, the invention will respond to this event by issuing a data packet halting message to activate the data packet transfer interface to temporarily halt the data packet transfer operation, and then continually inspecting whether the memory unit has released sufficient free storage space for the processing of the first-priority data packet queued in the data packet transfer interface; if YES, the first-priority data packet will be transferred to a buffer area in the memory unit for being processed by the data packet processing unit. This feature can help prevent the occurrence of a deadlock condition in the computer system due to a memory-sufficient condition in the memory unit, so that the overall system throughput of the computer system can be ensured. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A data packet queue handling method for use on a computer system having a data packet generating unit, a data packet transfer interface, a data packet processing unit, and a memory unit, wherein the data packet generating unit is capable of generating a sequence of data packets which are transferred via the data packet transfer interface to the data packet processing unit;

the data packet queue handling method comprising:

in the event of an interrupt message being issued by the data packet transfer interface while receiving at least one data packets from the data packet generating unit, responding to the interrupt message by inspecting the memory amount requested by the first-priority data packet queued in the data packet transfer interface and accordingly issuing a corresponding memory space inspection enabling message;

responding to the memory space inspection enabling message by inspecting whether the current free storage space of the memory unit is sufficient to satisfy the requested memory amount by the first-priority data packet queued in the data packet transfer interface; if YES, issuing a memory-sufficient message, and if NO, issuing a memory-insufficient message;

responding to the memory-sufficient message by arranging the first-priority data packet queued in the data packet transfer interface into a buffer area in the memory unit for being processed by the data packet processing unit;

responding to the memory-insufficient message by issuing a data packet halting message to command the data packet transfer interface to temporarily halt data packet transfer operation, and thereafter continually issuing a memory space inspection enabling message to the memory space inspecting module until the memory space inspecting module issues a memory-sufficient message; and repeating the above data packet queue handling procedure for the next-priority data packet queued in the data packet transfer interface until all data packets queued in the data packet transfer interface have been transferred to the data packet processing unit.

2. The data packet queue handling method of claim 1, wherein the data packet generating unit is a peripheral device, the data packet transfer interface is an I/O (Input/Output) control chip, and the data packet processing unit is a software-based driver module.

3. The data packet queue handling method of claim 1, further comprising:

responding to an event of the data packet transfer interface being fully loaded with data packets and unable to accommodate more data packets from the data packet generating unit by commanding the data packet generating unit to stop outputting data packets to the data packet transfer interface.

4. A data packet queue handling system for use with a computer system having a data packet generating unit, a data packet transfer interface, a data packet processing unit, and a memory unit, wherein the data packet generating unit is capable of generating a sequence of data packets which are transferred via the data packet transfer interface to the data packet processing unit;

the data packet queue handling system comprising:

a data packet memory amount inspecting module, which is capable of being activated by an interrupt message issued by the data packet transfer interface in the event that the data packet transfer interface receives at least one data packets from the data packet generating unit, and capable of responding to the interrupt message by inspecting the memory amount requested by the first-priority data packet queued in the data packet transfer interface and accordingly issuing a corresponding memory space inspection enabling message;

a memory space inspecting module, which is capable of responding to the memory space inspection enabling message from the data packet memory amount inspecting module by inspecting whether the current free storage space of the memory unit is sufficient to satisfy the requested memory amount by the first-priority data packet queued in the data packet transfer interface; if YES, capable of issuing a memory-sufficient message, and if NO, capable of issuing a memory-insufficient message;

a queuing module, which is capable of responding to the memory-sufficient message from the memory space inspecting module by arranging the first-priority data packet queued in the data packet transfer interface into a buffer area in the memory unit for being processed by the data packet processing unit; and further after the first-priority data packet is arranged in the buffer area, capable of activating the memory space inspecting module to handle the next-priority data packet queued in the data packet transfer interface until all of the data packets have been arranged into the buffer area in the memory unit for being processed by the data packet processing unit; and a data packet halting module, which is capable of responding to the memory insufficient message from the memory space inspecting module by issuing a data packet halting message to command the data packet transfer interface to temporarily halt data packet transfer operation, and thereafter continually issuing a memory space inspection enabling message to the memory space inspecting module until the memory space inspecting module issues a memory-sufficient message.

5. The data packet queue handling system of claim 4, wherein the data packet generating unit is a peripheral device, the data packet transfer interface is an I/O (Input/Output) control chip, and the data packet processing unit is a software-based driver module.

6. The data packet queue handling system of claim 4, further comprising:

a data packet traffic control module, which is capable of responding to an event of the data packet transfer interface being fully loaded with data packets and unable to accommodate more data packets from the data packet generating unit by commanding the data packet generating unit to stop outputting data packets to the data packet transfer interface.

* * * * *